United States Patent [19]

Hills

[11] Patent Number: 4,703,603
[45] Date of Patent: Nov. 3, 1987

[54] PLYWOOD SHEETING SPACER CLIP

[75] Inventor: Robert A. Hills, Jacksonville, Fla.

[73] Assignee: Altech Industries, Inc., Jacksonville, Fla.

[21] Appl. No.: 910,209

[22] Filed: Sep. 22, 1986

Related U.S. Application Data

[63] Continuation of Ser. No. 745,536, Jun. 17, 1985, abandoned.

[51] Int. Cl.$^4$ .................................................. E04C 1/10
[52] U.S. Cl. ............................................ 52/584; 52/582
[58] Field of Search ................. 52/282, 582, 823, 781, 52/482, 584

[56] References Cited

U.S. PATENT DOCUMENTS

| | | | |
|---|---|---|---|
| 2,053,438 | 9/1936 | Lunken et al. | 52/584 |
| 2,567,554 | 9/1951 | Davey | 52/582 X |
| 2,934,180 | 4/1960 | Hammitt et al. | 52/781 |
| 3,416,282 | 12/1968 | Daugherty | 52/823 X |
| 3,479,770 | 11/1969 | Mock | 52/823 X |
| 3,712,015 | 1/1973 | Nelson | 52/729 |
| 3,738,083 | 6/1973 | Shimano | 52/282 X |
| 3,967,425 | 7/1976 | Wolverton et al. | 52/282 X |
| 4,020,611 | 5/1977 | Amos | 52/584 |

FOREIGN PATENT DOCUMENTS 121075   3/1946   Australia .............................. 52/781

OTHER PUBLICATIONS

Exhibit I, Clip described in American Plywood Association Publication; 1-1983.
Exhibit II, Clip designed by Applicant on sale on Jan. 1984, Southeastern Metals Mfg. Co. Inc.

Primary Examiner—Carl D. Friedman
Attorney, Agent, or Firm—Arthur G. Yeager

[57] ABSTRACT

A clip to maintain a selected spacing between abutting plywood sheets which comprises an I-shaped structure having parallel upper and lower webs joined at right angles to a connecting web perpendicular thereto and a spacing structure projecting outwardly from only one side of the connecting web which maintains the appropriate spacing between adjacent sheets.

8 Claims, 7 Drawing Figures

U.S. Patent   Nov. 3, 1987   4,703,603
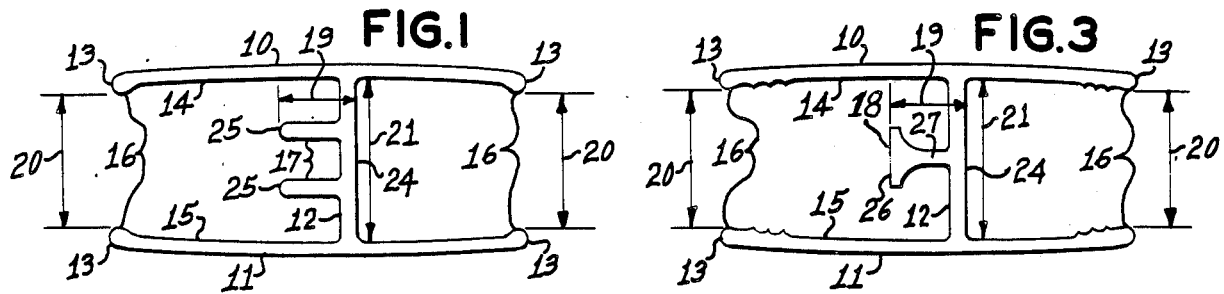
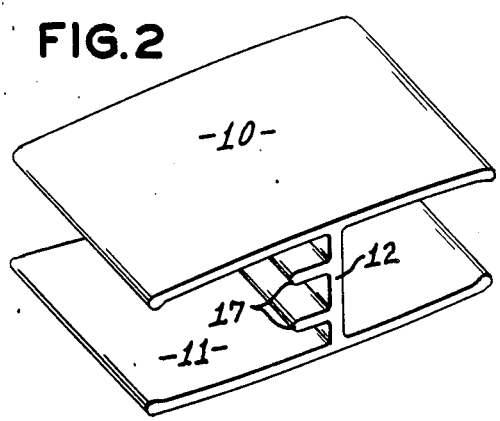
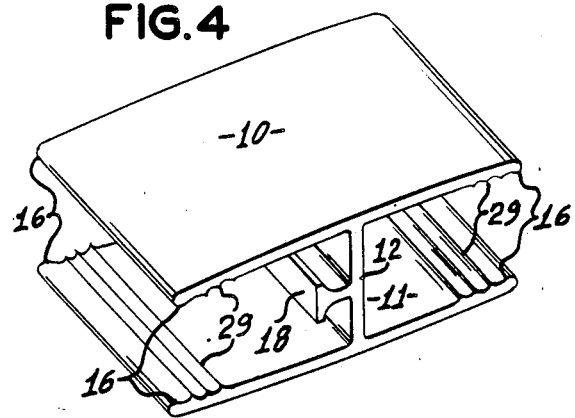
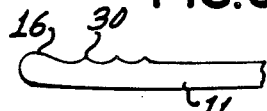
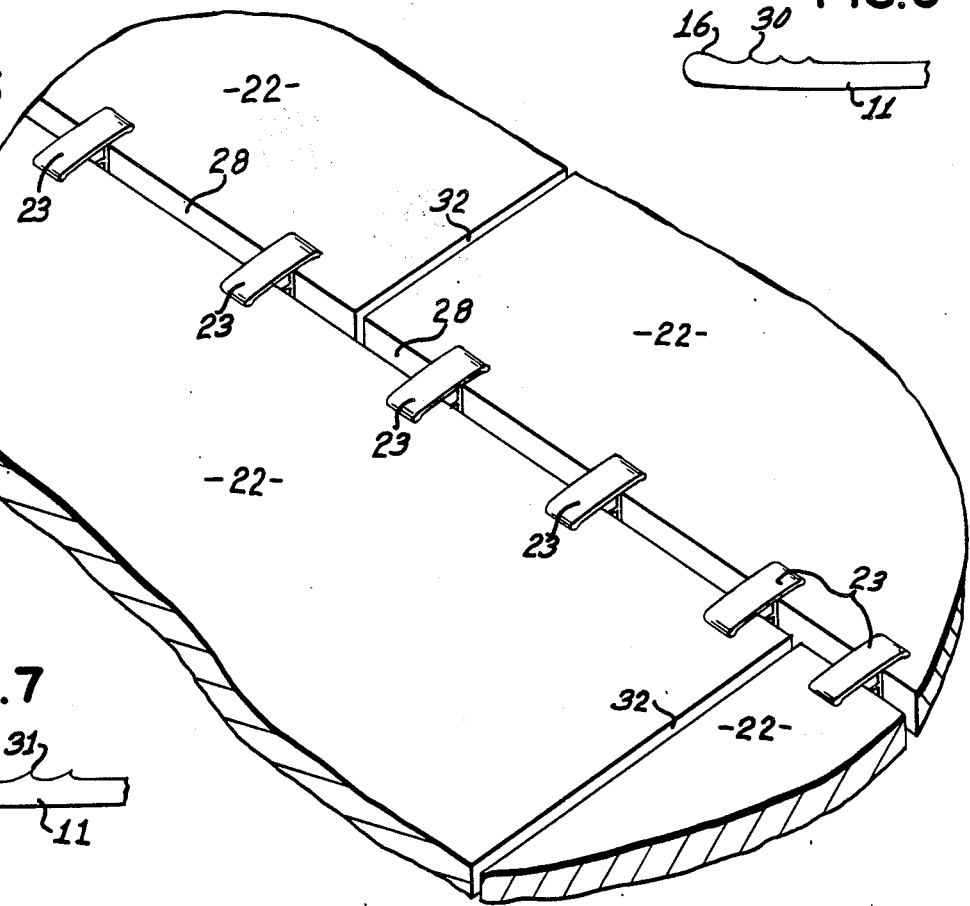
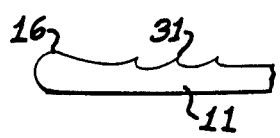

PLYWOOD SHEETING SPACER CLIP

This is a continuation of application Ser. No. 745,536, filed June 17, 1985 and now abandoned.

BACKGROUND OF THE INVENTION

In the construction of buildings that involve wooden framework, plywood sheeting is frequently employed to cover the framework as a base for an outer finish. For example, in the construction of a roof of a residence, plywood sheeting is normally used to cover the rafters. Tarpaper covers the outside surface of the plywood, and shingles or other roofing material is applied over the tarpaper. It has been found that if the plywood is fastened in place with each plywood sheet abutting snugly against the next sheet, moisture will eventually cause expansion of the sheets and they will buckle upwards along the abutting edges. Accordingly, it has become standard practice as specified, for example, by the American Plywood Association to lay the sheeting with $\frac{1}{4}$ inch spacing betwen the side edges of adjacent sheets. Clips have been developed which can be slid over the adjacent side edges of two sheets of plywood so as to provide the required spacing without the waste of time that would be spent in measuring and aligning each sheet to obtain the necessary spacing. The clips which have been known for this purpose are symmetrical I-shapes with a projection extending outwardly in both directions from the middle of the central web of the I-structure. The projections are designed to provide the proper spacing when two sheets of plywood are inserted between the top and bottom webs of the structure and pushed toward each other to contact the projection. These clips have not been satisfactory because in the haste of construction the worker may not obtain good contact between the projection and the edge of the plywood. In some cases the projection is sharp enough to pierce slightly into the edge of the wood. In other cases, the worker who is assembling sheets by hammer and by feel does not get the sheet snugly into contact with the projection. In both cases, the spacing is often inaccurate and the sheeting may be skewed.

It is an object of this invention to provide an improved spacer clip for plywood sheeting. It is another object to provide a spacer clip which will provide little chance for inaccurate spacing to occur in the assembly of sheeting. Other objects will appear in the more detailed description which follows.

BRIEF DESCRIPTION OF THE INVENTION

This invention relates to a plywood sheeting spacer clip comprising an I-shaped structure having an upper elongated web and a lower elongated web substantially parallel to each other attached to each end respectively of a connecting web substantially perpendicular to said upper and lower webs; and a spacer structure projecting outwardly from one side only and medially of said connecting web substantially medially of said upper and lower webs, said spacer structure including first face means for contacting an edge of a first sheet of plywood abutting thereon, said connecting web including second face means oppositely disposed to said first face means for contacting an edge of a second sheet of plywood abutting thereon, said first and second face means being substantially parallel for maintaining said edges of said first and second sheets of plywood at a uniform spacing.

In preferred embodiments the spacer structure is a pair of spaced blunt-end webs or a T-shaped structure with the cross bar of the T parallel to the connecting web. It is also preferred for the clip to have parallel webs that taper toward each other so as to provide a spring biased gripping action for the clip to secure itself to the plywood, preferably with a bead along each free end and spaced ridges adjacent said bead for gripping the plywood.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of a first embodiment of the spacer clip of this invention.

FIG. 2 is a perspective view of the spacer clip of FIG. 1.

FIG. 3 is a front elevational view of a second embodiment of the spacer clip of this invention.

FIG. 4 is a perspective view of the spacer clip of FIG. 3.

FIG. 5 is a schematic illustration in perspective of how the spacer clips of this invention are used with plywood sheeting.

FIG. 6 is an enlarged front elevational view of one type of ridges for gripping the plywood.

FIG. 7 is an enlarged front elevational view of a second type of ridges for gripping the plywood.

DETAILED DESCRIPTION OF THE INVENTION

In FIGS. 1-4 there are shown two types of novel spacer clips which are identical in all respects except as to the design of the spacer structure. Preferably the clip is made from an extruded aluminum structure which is chopped into short length clips. For use with $\frac{1}{2}$ inch plywood, the clip may be $\frac{1}{2}$ to $\frac{5}{8}$ inch wide and sufficiently wide to receive $\frac{1}{2}$ to $\frac{5}{8}$ inch of plywood from each side to stops which are spaced $\frac{1}{4}$ inch apart thus making the clips about $1\frac{1}{4}$ to $1\frac{1}{2}$ inches long.

Each clip is an I-shaped structure comprising an upper web 10 and a lower web 11 substantially parallel to each other joined to a connecting web 12 at substantially right angles. Web thicknesses are as small as possible to reduce cost, although the thickness must be large enough to provide strength against crumpling during manufacture and during eventual use. Thickness of about 0.030 to about 0.080 is preferred. The distance between the inside surface 14 of upper web 10 and thin side surface 15 of web 11 varies to accommodate the thickness of the plywood to which the clip is to be applied, the most commonly used size being $\frac{1}{2}$ inch. Thus distance 21 is intended to be substantially identical to the thickness of the plywood sheeting.

Webs 10 and 11 are closer to each other at edges 13 than adjacent connecting web 12 because webs 10 and 11 are curved or tapered toward each other. In the drawings this means that distances 20 are smaller than distance 21. The reason for this tapering is to provide a spring bias which results in a slight gripping action at edges 13. This gripping action gives a positive pressure to assist in holding the clip in its desired position on the plywood sheeting to which it is applied. It is preferred to provide a small bead 16 on inside surfaces 14 and 15 at edges 13 to accentuate this gripping effect. Such a bead need only be 0.001 to 0.002 inch in thickness. It is also preferable to include adjacent beads 16 a plurality of spaced ridges 29, as shown in FIGS. 3 and 4, which serve the purpose of gripping the adjoining plywood. Such ridges may be substantially the same elevation as that of bead 16 or slightly thereabove when the plywood forces the webs 10 and 11 into their parallel condition.

On one side only of connecting web 12 is a spacer structure which is intended to provide the exact spacing desired between side edges of adjacent sheets of plywood. One sheet will abut against the spacer structure and the next adjacent sheet will abut against the other side of connecting web 12, i.e., surface 24. The spacer structure may take any of several shapes, although only two are shown as preferred. The spacer structure should be small in volume and relatively simple in design so as to be less costly to make from extruded aluminum. The structure must have a blunt face that will not pierce or dent the edge of the plywood and it must receive and readily guide the edge of the plywood to an accurate spacing with the adjacent sheet. One type of such a structure is shown in FIGS. 1 and 2 as two spaced webs or fingers 17. Webs 17 should be spaced apart sufficiently to prevent any tilting or skewing of the plywood. Webs 17 have rounded blunt ends 25 which will not pierce or dent the edge of the plywood to cause inaccurate spacing.

In FIGS. 3 and 4 there is shown an alternate embodiment of the spacer structure 18 in the form of a T. The cross bar portion 26 provides the broad blunt face against which the plywood edge abuts and the leg 27 of the T is attached to connecting web 12. Thus cross bar portion 26 is substantially parallel to connecting web 12. The portions of structure 18 which connect cross bar portion 26 with leg 27 are shown to be smoothly rounded so as to provide the shape that is relatively easy to extrude.

In FIG. 5 there are shown four adjoining sheets 22 of plywood with spaces 28 between side edges of adjoining sheets and spaces 32 between top and bottom edges of adjoining sheets. Plywood sheets are normally made in sizes of 48 inches by 96 inches. It is the longer side (96 inches) which is requested to be spaced apart from adjacent sheets by clips while the shorter sides (called top and bottom) are not spaced by clips. Clips 23 are positioned spacedly along the side edges of sheets 22 to maintain spaces 28 accurately at, for example, ¼ inch as shown by distance 19 in FIGS. 1 and 3. The plywood sheets 22 are inserted between upper and lower webs 10 (see FIGS. 1-4) and pushed inwardly as far as possible, i.e., until the edge of the plywood bears against surface 24 or the blunt ends 25 or 26 of webs 17 or T-web 18, respectively. Spacings 32 between top and bottom edges of adjacent sheets are not required to be maintained by means of clips. These spaces 32 are made to be approximately ⅛ inch. Sheets are then positioned with the proper spacing 28 and may be nailed to the rafters underneath to maintain that spacing permanently.

FIGS. 6 and 7 illustrate two embodiments of the ridges which provide a better gripping action on the plywood than clips without such ridges. In FIG. 6 ridges 30 on web 11 adjacent to bead 16 are pointed upward and generally perpendicular to web 11. In FIG. 7 ridges 31 on web 11 adjacent to bead 16 are pointed upward and angled away from bead 16 toward connecting web 12. This structure provides a better bite on the plywood than that of FIG. 6 and therefore provides more assurance that the clip will not slide away from proper seating on the plywood sheet to which it is attached.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A unitary plywood sheeting metal spacer clip adapted to be slidingly engageable to the edge of plywood sheeting and to resist removal therefrom said spacer clip having an I-shape including an upper and lower web substantially parallel with each other and a connecting web attached to each of said upper and lower webs at substantially right angles thereto and generally medially thereof, said upper and lower webs having outer free edges substantially parallel to said connecting web, said upper and lower webs being tapered toward each other such that such upper and lower webs are closer together at said free edges than at said connecting web, and a spacer structure projecting outwardly solely from one side of said connecting web substantially medially thereof, said structure comprising a T-shaped projection having an elongated leg having one end attached perpendicularly to said connecting web medially thereof, and an elongated broad blunt faced cross bar having opposite ends and being parallel to said connecting web and connected to the other end of said leg and extending generally parallel to said connecting web and having its respective said ends terminating remote but substantially equidistant from said upper and lower webs, said blunt face of said cross bar to the opposite side wall of said connecting web being the desired spacing for a pair of plywood sheets to which at least a pair of said clips are attachable, said cross bar blunt face and said opposite side wall of said connecting web forming spaced and enlarged planar surfaces engageable with edges of a pair of plywood sheets without any possible embedding in such plywood sheet edges, said blunt face and said opposite side wall being substantially equidistant from respective said free edges of both said upper and lower webs, said upper and lower webs being free of any openings therethrough.

2. The spacer clip of claim 1 wherein said upper and lower webs each have inside surfaces that face each other and include a bead on each of said inside surfaces of said webs adjacent respective said free edges.

3. The spacer clip of claim 1 wherein said inside surfaces includes a plurality of spaced ridges adjacent said free edges of each said web and generally parallel to said free edges and having a saw tooth profile when viewed in cross section perpendicularly to said ridges, said ridges being adapted to firmly grip plywood sheets inserted between said webs.

4. A unitary plywood sheeting metal spacer clip adapted to be slidingly engageable onto the edge of plywood sheeting and resistant of removal therefrom, said spacer clip comprising an I-shaped structure having an upper elongated web and a lower elongated web substantially parallel to each other, an elongated connecting web having opposite ends and two parallel sides substantially perpendicular to said upper and lower webs; a blunt faced spacer structure projecting outwardly from one side only of said connecting web substantially medially of said upper and lower webs, said opposite ends of said connecting webs being respectively connected to said upper and lower elongated webs, said spacer structure including first face means for contacting an edge of a first sheet of plywood abutting thereon without said first face means being embedded in such edge, the other side of said connecting web forming a second substantially smoother and planar face means oppositely disposed to said first face means and extending substantially completely between said upper and lower webs for contacting an edge of a second sheet of plywood abutting thereon without said second face means being embedded in such edge, said first and second face means being substantially parallel for maintaining such edges of a first and second sheets of plywood at a uniform parallel spacing, said upper and lower elongated webs including inside surfaces joining said sides of said connecting web and outer edges parallel to said sides of said connecting web, said inside surfaces being spaced apart at said connecting web substantially the thickness of a first and second sheets of plywood and being spaced apart at said outer edges an amount less than the thickness thereof, said first face means and said second face means being substantially equidistant from respective said opposite ends of both said upper and lower elongated webs, said upper and lower webs being free of any openings extending generally along said connecting web, each of said upper and lower webs being about twice as long between their said opposite end portions as the widths thereof, said connecting web length being sized to substantially the thickness of plywood sheets to be connected by said clip, said spacer structure including a single T-shaped projection having a leg attached to a medial portion of said connecting web and extending generally parallel to said upper and lower webs, and an elongated broad blunt faced cross bar portion connected to the free end of said leg and extending generally parallel to said connecting web with its opposite ends being spaced substantially equally respectively from said upper and lower webs, said leg and said cross bar portion each having a thickness generally the same as said connecting web, said cross bar portion having a length between its said opposite ends less than one-half of the length of said connecting web.

5. The spacer clip of claim 4 wherein each of said inside surfaces include an inwardly facing bead adjacent each of said outer edges.

6. A unitary plywood sheeting metal spacer clip adapted to be slidingly engageable to the edge of plywood sheeting and to resist removal therefrom, said spacer clip having an I-shape including an upper and lower web substantially parallel with each other and a connecting web attached to each of said upper and lower webs at substantially right angles thereto and generally medially thereof, said upper and lower webs having outer free edges substantially parallel to said connecting web, said upper nd lower webs being tapered toward each other such that said upper and lower webs are closer together at said free edges than at said connecting web, each of said upper and lower webs being about twice as long between their said outer free edges than the widths thereof, and a spacer structure projecting perpendicularly outwardly solely from one side of said connecting web substantially medially thereof, said spacer structure comprising two spaced and elongated projections, each having a rounded blunt end with the distance from said blunt ends to the opposite side wall of said connecting web being the desired spacing for a pair of plywood sheets to which at least a pair of said clips are spacedly attachable and function solely as spacers between such sheets, said projections having substantially the thickness of said connecting web and each being defined by a pair of spaced planar and parallel faces which are substantially parallel to said upper and lower webs, said blunt ends of said projections and said opposite side wall being substantially equidistant from respective said free edges of both said upper and lower webs, said upper and lower webs being free of any openings therethrough or any lateral and outward projections therefrom.

7. The spacer clip of claim 6 wherein said upper and lower webs include inside faces, said inside faces adjacent said outer edges a plurality of spaced elongated ridges running generally parallel to said outer free edges, said ridges being adapted to firmly grip the adjoining surface of the plywood sheeting to which said clip is attachable.

8. The spacer clip of claim 6 wherein said upper and lower webs each include inside surfaces that face each other and include a bead on each of said inside surfaces of said webs adjacent respective said free edges.

* * * * *